UNITED STATES PATENT OFFICE.

HENRY J. DUNN, OF LONDON, ENGLAND.

PROCESS OF MAKING MEAT EXTRACTS.

SPECIFICATION forming part of Letters Patent No. 649,284, dated May 8, 1900.

Original application filed March 27, 1899, Serial No. 710,691. Divided and this application filed July 22, 1899. Serial No. 724,816. (No specimens.)

*To all whom it may concern:*

Be it known that I, HENRY JOHN DUNN, glove manufacturer, a citizen of England, residing at No. 15 Walpole road, Twickenham, London, in the county of Middlesex, England, have invented certain new and useful Improvements in the Manufacture of Food Extracts, (for which I have applied for a patent in Great Britain, dated February 13, 1899, No. 3,204; in Canada, dated March 27, 1899, No. 85,274, and in France, dated April 15, 1899, No. 275,827,) of which the following is a specification.

My invention relates to the treatment of animal food, whether meat, poultry, or fish, so as to obtain it in the form of an extract containing all the nutriment and available as a basis for soups or other nutritive liquids, which invention was originally included in my application, filed March 27, 1899, Serial No. 710,691, but has been made the subject of a fresh application, a devision having been required by the examiner. For this purpose I first remove most of the fat, except in the case of fish, and I mince the food or otherwise reduce it to small fragments, which I expose to a current of dry air, which may be sterilized. The air is preferably cold, not exceeding 60° Fahrenheit. It may, however, toward the last be somewhat warmed, but not above 100° Fahrenheit, above which temperature it would render a portion of the albuminous constituents of the food insoluble. When the fragments are dry, containing about five per cent. water, they are greatly reduced in weight by elimination of the moisture. These fragments are then reduced to a powdered condition by grinding. The meat in the form of powder obtained by grinding the fragments is agitated in about five times its weight of cold water. After a time most of the liquid is drained off and the wet residue is subjected to centrifugal action or filter-pressing, or preferably to pressing in pervious bags, so as to extract all the remaining liquid, which is then added to that which had been before drained off. The whole is then concentrated to any desired degree by evaporation, preferably by forcing cold dry air through the liquid or evaporating at a low temperature *in vacuo*.

When it is not desired to retain the albuminous constituents of the food in soluble condition, the mixture of the fine fragments or powder with water may be heated during the process of extraction, it may be to 200° Fahrenheit.

The first drying is necessary in order to be able to reduce the meat to a fine powder, this powdered condition of the meat being necessary in order to get an extract of superior quality, which, moreover, is thus obtained in less time and with less labor in consequence of the meat being in powdered form.

Usually in making meat extract the quantity of water required to fully extract the constituents of meat framents that are not dry is from eight to twelve times the weight of the meat. Consequently one hundred pounds of meat requires at least eight hundred pounds of water, making a total of nine hundred pounds to be concentrated by evaporation. By drying and powdering I reduce one hundred pounds to twenty-five pounds, and as the meat is in fine particles I can fully extract the nutritive constituents by employing only four times the weight of water—that is, one hundred pounds—making altogether one hundred and twenty-five pounds to be concentrated to a much less extent than the one hundred pounds. Thus the drying and grinding or pulverizing and the extracting are necessary and intimately-connected operations in my process, for the final product, which is an extract of superior quality, cannot be so well obtained without the preliminary steps of drying and pulverizing.

Having thus described the nature of this invention and the best means I know of carrying the same into practical effect, I claim—

The process herein described of manufacturing animal-food extract, which consists in first comminuting the animal substance, then subjecting it to the drying action of a current of dry cool air, then reducing the dry comminuted material to powder, then agitating the powdered substance in water, then draining off most of the liquid, then extracting from the residue the liquid remaining therein, then mixing the said extracted liquid with the liquid drained off and finally concentrating the said mixed liquids, substantially as set forth.

In testimony whereof I have hereunto set my hand in presence of two subscribing witnesses.

HENRY J. DUNN.

Witnesses:
FRED C. HARRIS,
GERALD L. SMITH.